United States Patent
Luo et al.

(10) Patent No.: US 9,565,540 B2
(45) Date of Patent: Feb. 7, 2017

(54) METHOD AND APPARATUS FOR HANDLING A MISSED GROUP CALL IN A PUBLIC SAFETY COMMUNICATION SESSION

(71) Applicant: MOTOROLA SOLUTIONS, INC, Schaumburg, IL (US)

(72) Inventors: Chao-Jin Luo, Chengdu (CN); Xiao-Yu Li, Chengdu (CN); Fan Luo, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/913,702

(22) PCT Filed: Sep. 27, 2013

(86) PCT No.: PCT/CN2013/084486
§ 371 (c)(1),
(2) Date: Feb. 23, 2016

(87) PCT Pub. No.: WO2015/042880
PCT Pub. Date: Apr. 2, 2015

(65) Prior Publication Data
US 2016/0205517 A1 Jul. 14, 2016

(51) Int. Cl.
*H04W 4/10* (2009.01)
*H04W 4/16* (2009.01)
*H04W 4/12* (2009.01)

(52) U.S. Cl.
CPC ............... *H04W 4/16* (2013.01); *H04W 4/10* (2013.01); *H04W 4/12* (2013.01)

(58) Field of Classification Search
CPC ............... H04B 4/10; H04B 4/12; H04B 4/16; H04B 4/22; H04B 7/00; H04W 4/10; H04W 72/04; H04W 76/023; H04W 76/002; H04W 36/02; H04W 4/12; H04W 4/16; H04L 5/16; H04L 29/06; H04L 65/403; H04L 51/24; H04L 51/10; G06F 3/0484
See application file for complete search history.

(56) References Cited

U.S. PATENT DOCUMENTS

| 5,634,196 A | 5/1997 | Alford |
| 6,353,730 B1 | 3/2002 | Buettner et al. |
| 7,409,050 B1 | 8/2008 | Li et al. |

(Continued)

FOREIGN PATENT DOCUMENTS

CN 101494883 A1 7/2009

OTHER PUBLICATIONS

International Search Report and Written Opinion, PCT/CN2013/084486, filed Sep. 27, 2013, all pages.

*Primary Examiner* — Thanh Le

(57) ABSTRACT

A communication system is provided that alerts a public safety officer to missed Push-to-Talk (PTT) group calls. The communication system allows a public safety officer's radio to record a last stop working time. A public safety network then can search a missed call list associated with the public safety officer and automatically push a notification of missed PTT group calls to the public safety officer's radio when the radio re-joins the public safety network. Based on the notification, the public safety officer can choose to review or replay any missed calls to avoid missing important information.

14 Claims, 11 Drawing Sheets

(56) References Cited

U.S. PATENT DOCUMENTS

| | | |
|---|---|---|
| 8,180,036 B2 | 5/2012 | Plas et al. |
| 2005/0047561 A1 | 3/2005 | Seiferth |
| 2006/0025122 A1 | 2/2006 | Harris et al. |
| 2006/0287005 A1 | 12/2006 | Benco et al. |
| 2007/0155415 A1* | 7/2007 | Sheehy ............... H04W 76/005 455/518 |
| 2009/0017802 A1 | 1/2009 | Zhang et al. |
| 2010/0086112 A1 | 4/2010 | Jiang et al. |
| 2013/0196705 A1 | 8/2013 | Nosou et al. |
| 2014/0272814 A1* | 9/2014 | Parent .................. G06F 3/0484 434/112 |
| 2015/0117397 A1* | 4/2015 | Ofir ........................ H04L 65/60 370/331 |

* cited by examiner

METHOD AND APPARATUS FOR HANDLING A MISSED GROUP CALL IN A PUBLIC SAFETY COMMUNICATION SESSION

FIELD OF THE INVENTION

The present invention relates generally to cellular communication systems and, in particular, to provision of group call services in a Public Safety communication system.

BACKGROUND OF THE INVENTION

Compared to wireline telephone and public cellular communciation systems, a group call in a Land Mobile Radio (LMR) communciation system is unreliable. That is, a call originator can establish and complete an LMR group call without knowing of the state or participation of other team members, which may have fatal consequences in mission critical communications. For example, a team member's LMR may be temporarily powered down or in shut down state due to a low battery, or the team member may be out of radio frequency range, with the result that the team member may miss the call. Meanwhile, the call originator may not aware that one or more team members have missed some or all information conveyed in the call.

For example, an emerging trend in policing is 'One-Man Patrolling' carried out by community public safety officer. Suppose a public safety officer is one-man patrolling a street in a district and enters a building where the officer's LMR is out of service. A command center may not be aware that the officer's LMR is out of service and may originate a group call requesting that all patrolling public safety officers in this district move to a particular site for an emergency event. But the command center may be unaware that the public safety officer has missed this (voice) notification since it is a group call and no voice acknowledgements from individuals are required. Five minutes later, the public safety officer may return to RF coverage and the LMR may automatically return to the LMR commuication network, but the public safety officer is unaware of the missed call.

Figure 1:
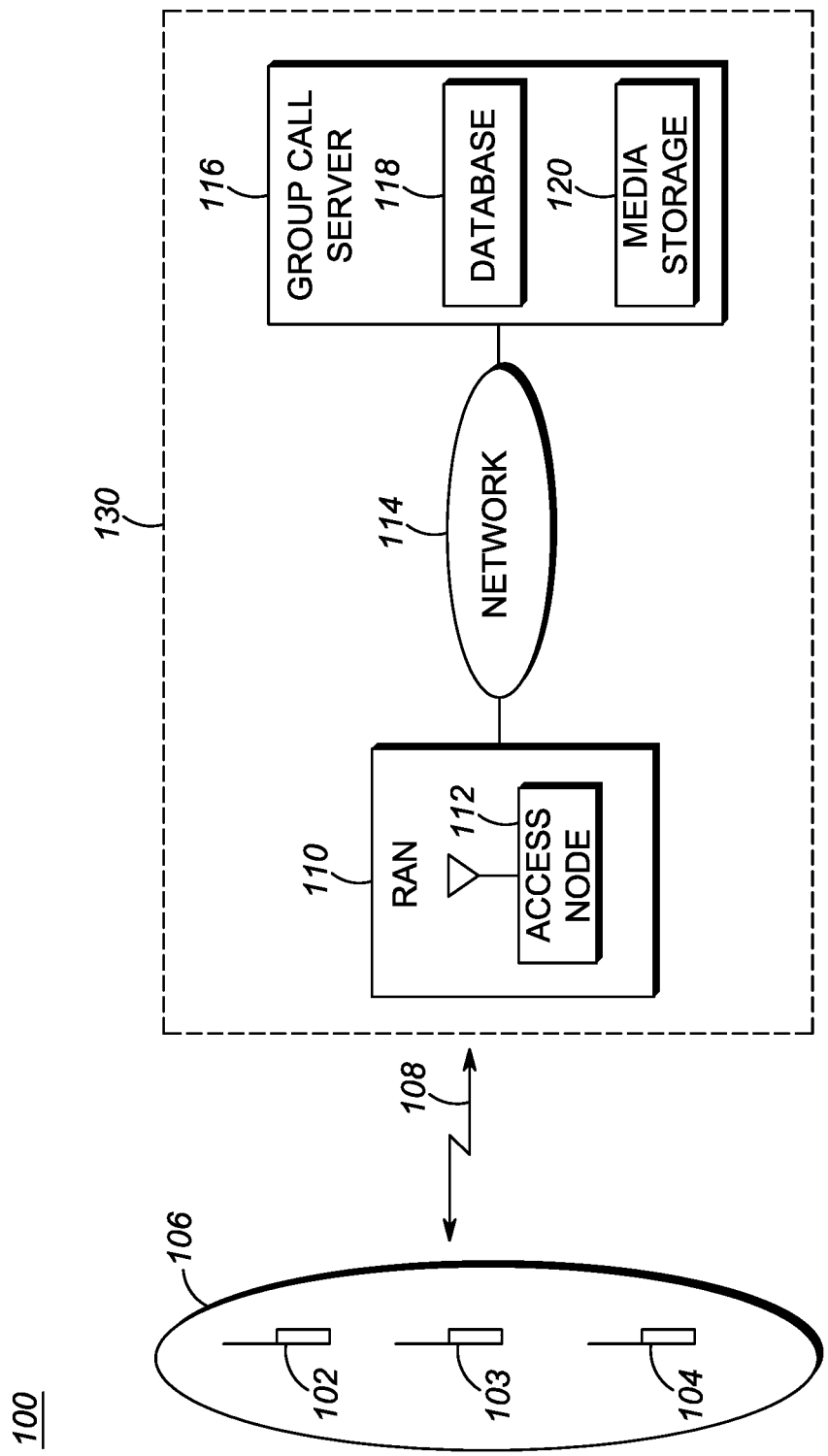
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

A communication system is provided that alerts a public safety officer to missed Push-to-Talk (PTT) group calls. The communication system allows a public safety officer's radio to record a last stop working time. A public safety network then can search a missed call list associated with the public safety officer and automatically push a notification of missed PTT group calls to the public safety officer's radio when the radio re-joins the public safety network. Based on the notification, the public safety officer can choose to review or replay any missed calls to avoid missing important information.

Generally, an embodiment of the present invention encompasses a method for retrieving missed group call information in a public safety communication system. The method includes determining, by a mobile station (MS), that the MS has lost system coverage, storing, by the MS, a coverage loss time, wherein the coverage loss time is a time associated with the loss of system coverage, detecting, by the MS, a resumption of system coverage, querying, by the MS, an infrastructure for missed group calls, wherein the query comprises the coverage loss time, and in response to the query, receiving, by the MS, missed group call information, wherein the missed group call information is information associated with group calls initiated subsequent to the coverage loss time.

Another embodiment of the present invention encompasses a method for providing missed group call information in a public safety communication system. The method includes receiving, at an infrastructure element from an MS, a query for a missed group call, wherein the query comprises an identifier of the MS and a coverage loss time and wherein the coverage loss time is a time at which the MS lost system coverage, retrieving, by the infrastructure element, information associated with one or more missed group calls, wherein the one or more missed group calls each are associated with the identifier of the MS and that were initiated subsequent to the coverage loss time, and conveying, by the infrastructure element to the MS, information associated with the one or more missed group calls.

Still another embodiment of the present invention encompasses an MS that includes a transceiver, an at least one memory device, and a processor. The processor is configured to determine a loss of system coverage, store, in the at least one memory device, a time associated with the loss of system coverage, detect a resumption of system coverage, query, via the transceiver, an infrastructure for missed group calls, wherein the query comprises the time associated with the loss of coverage, and in response to the query, receive, via the transceiver, a list of one or more missed group calls, wherein the missed group calls were calls initiated subsequent to the time associated with the loss of coverage.

Yet another embodiment of the present invention encompasses a group call server that includes an at least one memory device and a processor. The processor is configured to receive, from an MS, a query for a missed group call, wherein the query comprises an identifier of the MS and a coverage loss time and wherein the coverage loss time is a time at which the MS lost system coverage, in response to receiving the query, retrieve information associated with one or more missed group calls, wherein the one or more missed group calls each are associated with the identifier of the MS and that were initiated subsequent to the coverage loss time, and convey, to the MS, information associated with the one or more missed group calls.

The present invention may be more fully described with reference to FIGS. 1-10. FIG. 1 is a block diagram of a Public Safety (PS) wireless communication system 100 in accordance with an embodiment of the present invention. Communication system 100 includes multiple mobile stations (MSs) 102-104 (three shown) such as but not limited to a two-way radio such as a land mobile radio (LMR), a cellular telephone, a smart phone, and so on, and that are each a member of a talkgroup 106. Each MS 102-104 preferably is a Public Safety (PS) device that communicates with a radio access network (RAN) 110 of communication system 100 via a Public Safety Narrowband (PSNB) spectrum. However, in other embodiments of the present invention, each MS 102-104 may any type of wireless user device, such as a personal device (for example, a cellular telephone) that communicates with RAN 110 via a wireless network technology such as Code Division Multiple Access 2000 (CDMA 2000), Universal Mobile Telecommunication System (UMTS), Frequency Division Multiple Access (FDMA), Time Division Multiple Access (TDMA), Long Term Evolution (LTE), Wireless Local Area Network (WLAN) as described by the IEEE 802.xx standards, for example, the 802.11, 802.15, 802.16, or 802.20 standards, or Orthogonal Frequency Division Multiple Access (OFDM).

RAN 110 includes an access node 112, such as a Base Transceiver Station (BTS), that provides wireless communications services to MSs in a coverage area of the access node, such as MSs 102-104, via an air interface 108 that includes a forward link and a reverse link. While MSs 102-104 are depicted as being served by a same access node, one of ordinary skill in the art realizes that one or more of MSs 102-104 may be serviced by a different access node than the other MSs.

Communication system 100 further includes a Group Call Server 116, such as a Push-to-Talk (PTT) server, that is in communication with access node 112 via an intervening network 114, such as the Internet or a private network. Group Call Server server 116 controls group sessions of a LMR communication group, including managing talkgroups and lists that are needed for provision of LMR service, for example, maintaining identifiers of and contact information for members of a talkgroup. More particularly, Group Call Server 116 provides talkgroup list management functionality to communication system 100, for example, creating, modifying, retrieving and deleting talkgroups, such as talkgroup 106, for authorized users, providing storage for talkgroups and lists, and providing notifications to authorized users of modifications to the talkgroups and lists. Each talkgroup includes a talkgroup identifier that is uniquely associated with the talkgroup and, in association with the talkgroup identifier, a list of member identifiers, such as MS identifiers, that uniquely identify each member of the talkgroup.

When an inquiry, for example, from one of MSs 102-104, to Group Call Server 116 specifies a talkgroup identifier, that is, requests a definition of a specified talkgroup, in response the Group Call Server may provide, to the MS, a list of MS identifiers associated with the members of the specified talkgroup. For example, in response to an inquiry specifying a talkgroup identifier associated with talkgroup 106, the Group Call Server may provide the MS identifiers associated with MSs 102-104. When Group Call Server 116 detects a group call initiation by a respective member of a talkgroup, such as one of MSs 102-104 with respect to talkgroup 106, the Group Call Server automatically attempts to connect all of the members of the group in a group call.

Group Call Server 116 includes a Group Call Database 118 that maintains a listing of all group calls involving the Group Call Server, which listing includes, for each group call, a start time of the group call, a termination time, or stop time, of the group call, and one or more of (1) a talkgroup identifier associated with the group call and (2) MS identifiers associated with each MS that is a member of the talkgroup associated with the group call, regardless of whether the MS participated in the group call. Group Call Server 116 futher participates in each group call, for example, receiving media, such as audio or video data, from a participant in the group call and distributing the media to the other participants in the group call, and includes a Media Storage 120 that stores a copy of the media exchanged via the Group Call Server as part of the group call. Media conveyed to the Media Storage 120 is stored in association with the talkgroup identifier associated with the group call and/or MS identifiers associated with each MS that is a member of the talkgroup associated with the group call.

Access Node 112, Group Call Server 116, and intervening network 114 collectively comprise a public safety network, or infrastructure, 130 of public safety communication system 100 and, correspondingly, each may be referred to as an infrastructure element of communication system 100. In other embodiments of the present invention, one or more of Group Call Database 118 and Media Storage 120 may reside in an element of infrastructure 130 external to, and accessible by, Group Call Server 116 and the functionality described herein as being performed by Group Call Server 116 may be dsitriubted among other elements of infrastructure 130, such as gateways (not shown) and other application servers (not shown).

Figure 2:
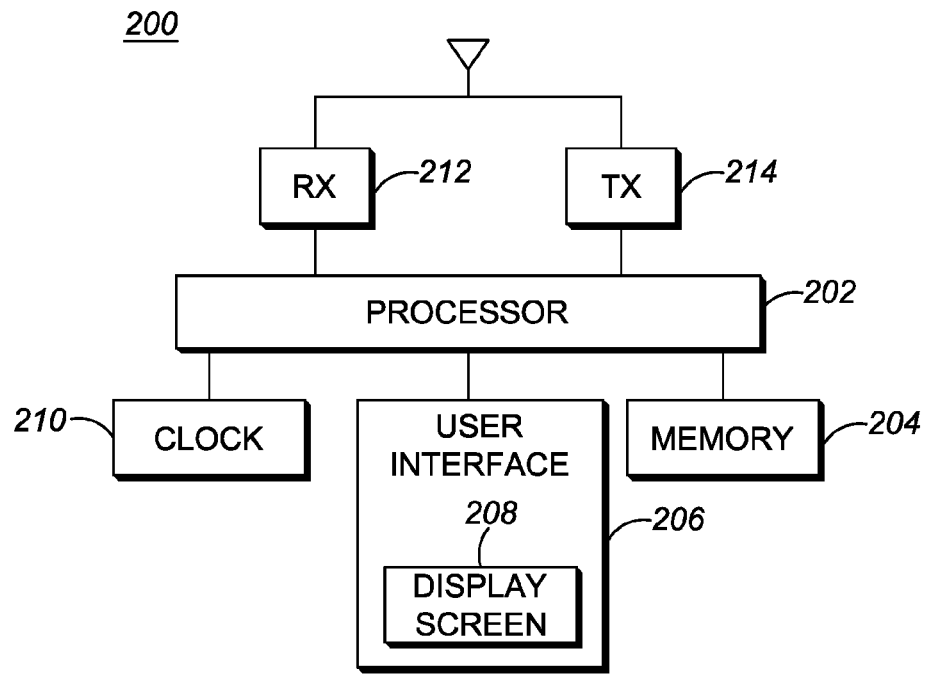
FIG. 2 is a block diagram of a mobile station of FIG. 1 in accordance with an embodiment of the present invention.

FIG. 2 is a block diagram of a MS 200, such as MSs 102-104, in accordance with an embodiment of the present invention. MS 200 includes a processor 202, such as one or more microprocessors, microcontrollers, digital signal processors (DSPs), combinations thereof or such other devices known to those having ordinary skill in the art. MS 200 further includes at least one memory device 204 associated with processor 202, such as random access memory (RAM), dynamic random access memory (DRAM), and/or read only memory (ROM) or equivalents thereof, that maintain data and programs that may be executed by the processor and that allow the MS to perform all functions necessary to operate in communication system 100.

The at least one memory device 204 further maintains a identifier (ID) of the MS that is uniquely associated with the MS and further may maintain a list of talkgroup identifiers that are each uniquely associated with a talkgroup of which the MS is a member and that may be engaged in a group call. The talkgroup identifiers may be preprogrammed into the at least one memory device 204 or may be added to the at least one memory device by a user of the MS.

MS 200 further includes a user interface 206, a reference clock 210, a radio frequency (RF) receiver 212, and an RF transmitter 214 that each are coupled to processor 202. User interface 206 provides a user of the MS with the capability of interacting with the MS, including inputting instructions into the MS. In one embodiment of the present invention, user interface 206 may include a display screen 208 and a keypad that includes multiple keys that may be used by a user of the MS to input instructions into the MS, including a group call key, such as a Push-to-Talk (PTT) key, that may be used to input an instruction to initiate, and to reserve a floor of, a group call. In another embodiment of the present invention, display screen 208 may comprise a touch screen that is able to determine a position (i.e., an X-coordinate and a Y-coordinate) of a user's touch on the touch screen and convey the position data to processor 202. Based on the position data, processor 202 then translates the user's touch into an instruction. Preferably, display screen 208 may display a "keypad" screen that comprises multiple softkeys, such as softkeys corresponding to keys on a conventional cellular telephone keypad and further including a group call softkey. User interface 206 further includes a microphone and associated audio input circuitry (not shown) for receiving audio input from the user of MS 200 and a speaker and associated audio output circuitry (not shown) for playing out audio to the user of MS 200.

Reference clock 210 maintains a reference time of communication system 100, for example, a time of day, and may be used by processor 202 to generate and convey a time stamp to infrastructure 130. Reference clock 210 may receive periodic time updates from a time source in communication system 100 that broadcasts a system time, or the reference clock may be coupled to a Global Positioning Satellite (GPS) receiver (not shown) included in MS 200 that receives the system time from a GPS system. RF receiver 212 provides MS 200 with the capability of receiving RF signals from RAN 110 and an RF transmitter 214 provides MS 200 with the capability of transmitting RF signals to RAN 110.

Figure 3:
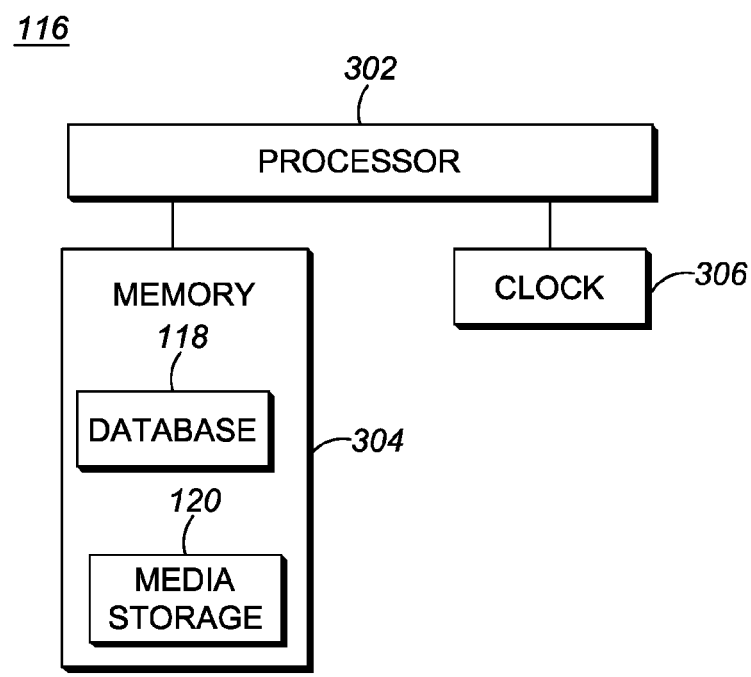
FIG. 3 is a block diagram of a Group Call Server of FIG. 1 in accordance with an embodiment of the present invention.

FIG. 3 is a block diagram of Group Call Server 116 in accordance with an embodiment of the present invention. Group Call Server 116 includes a processor 302, such as one or more microprocessors, microcontrollers, digital signal processors (DSPs), combinations thereof or such other devices known to those having ordinary skill in the art. Group Call Server 116 further includes at least one memory device 304 associated with processor 302, such as random access memory (RAM), dynamic random access memory (DRAM), and/or read only memory (ROM) or equivalents thereof, that store data and programs, such as group call programs, that may be executed by the processor and that allow the PoC Server to perform all functions necessary to operate in communication system 100. At least one memory device 304 further maintains Group Call Database 118 and Media Storage 120, wherein the storing and retrieving of data stored in Group Call Database 118 and of media stored in Media Storage 120 is performed by processor 302 based on programs maintained in at least one memory device 304.

However, as noted above, in other embodiments of the present invention one or more of Group Call Database 118 and Media Storage 120 may reside in an infrastructure element external to, and accessible by, Group Call Server 116, in which event the Group Call Database or Media Storage are maintained in an at least one memory device of the infrastructure element and the storing and retrieving of data stored in the Group Call Database and of media stored in the Media Storage is performed by a processor of the infrastructure element based on programs maintained in the at least one memory device of the infrastructure element.

Group Call Server 116 further includes a reference clock 306 that maintains a reference time of communication system 100, for example, a time of day, and that may be used by processor 302 to generate and apply a time stamp to stored data. Reference clock 304 may receive periodic time updates from a time source in communication system 100 that broadcasts a system time, or the reference clock may be coupled to a Global Positioning Satellite (GPS) receiver (not shown) in communication with Group Call Server 116 that receives system time from a GPS system. Reference clock 304 is synchronized with the reference clocks 210 of MSs 102-104, such that a time stamp provided to the Group Call Server can be compared to time stamps associated with stored data.

The embodiments of the present invention preferably are implemented within each of MSs 102-104 and Group Call Server 116, and more particularly with or in software programs and instructions stored in the at least one memory devices 204, 304 and executed by the processors 202, 302 of the MSs and Group Call Server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MSs 102-104 and Group Call Server 116, and all references to 'means for' herein may refer to any such implementation of the present invention. Based on the present disclosure, one skilled in the art will be readily capable of producing and implementing such software and/or hardware without undo experimentation.

Communication system 100 provides a user of an MS 102-104 with an ability to review or replay group calls missed by the user when out of coverage of the communication system. More particularly, communication system 100 automatically provides the user with notifications of such missed calls when the user's MS re-joins the communication system, and based on the notification the user can choose to review or replay the missed call to avoid missing important information. Thus a member of a Public Safety talkgroup that is engaged in an emergency situation will not miss information conveyed in a missed call and that may be mission cirtical.

Figure 4A:
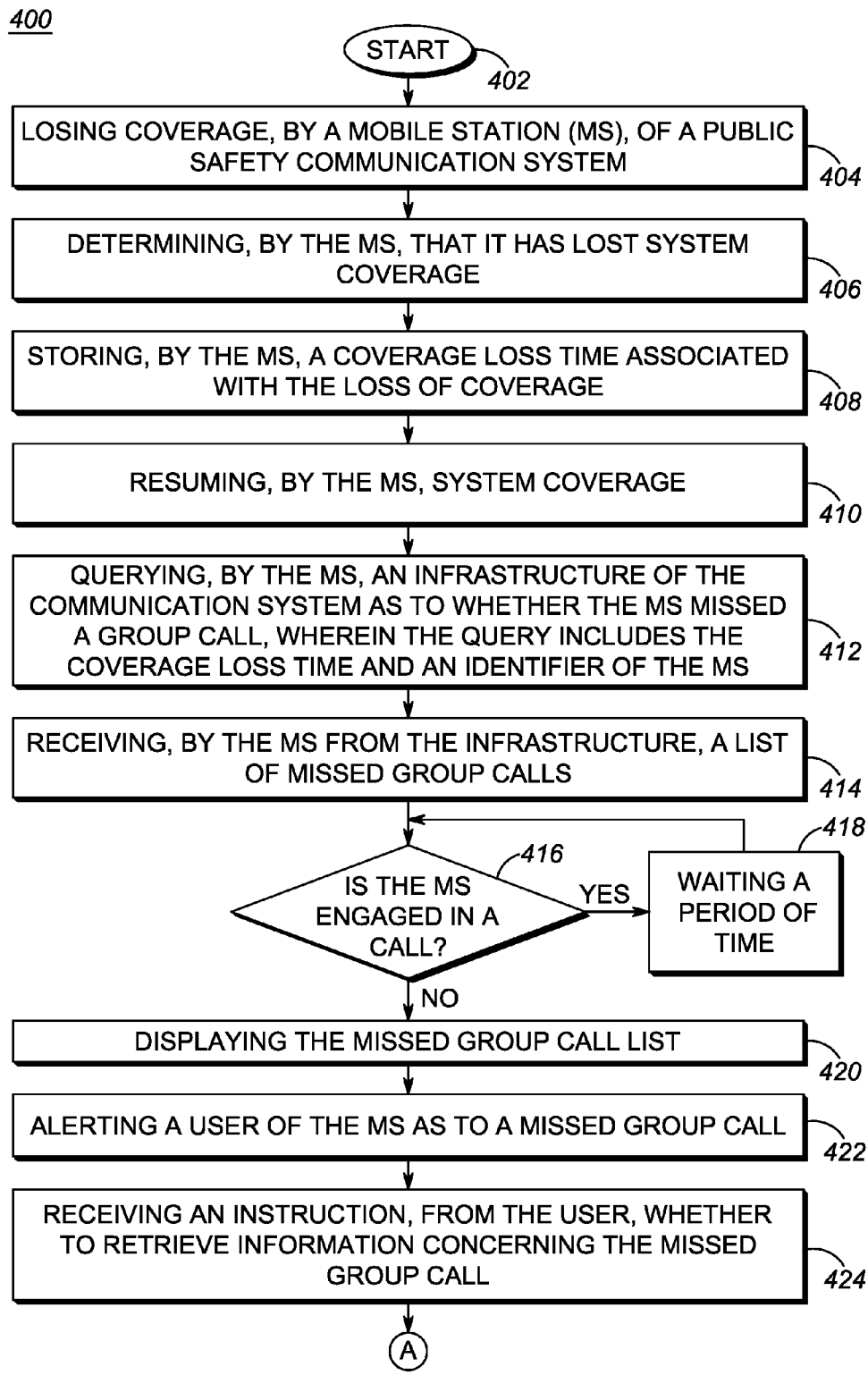
FIG. 4A is a logic flow diagram illustrating a handling of a missed group call by a mobile station (MS) of FIG. 1 in accordance with an embodiment of the present invention.
Figure 4B:
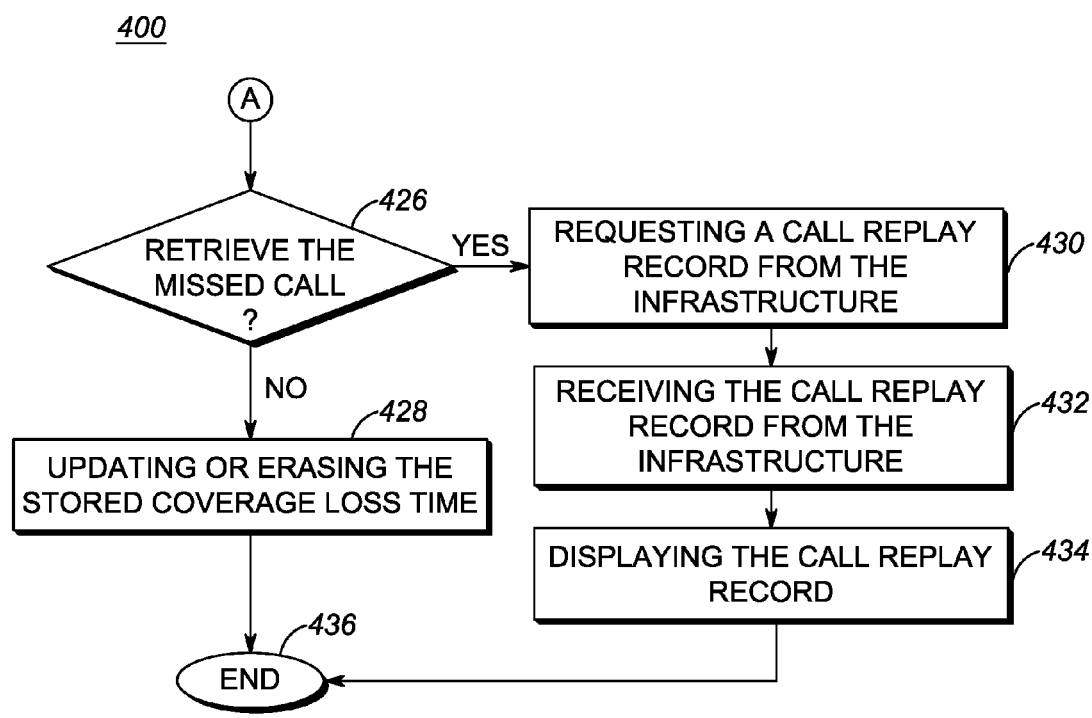
FIG. 4B is a continuation of the logic flow diagram of FIG. 4A illustrating a handling of a missed group call by an MS of FIG. 1 in accordance with an embodiment of the present invention.
Figure 5:
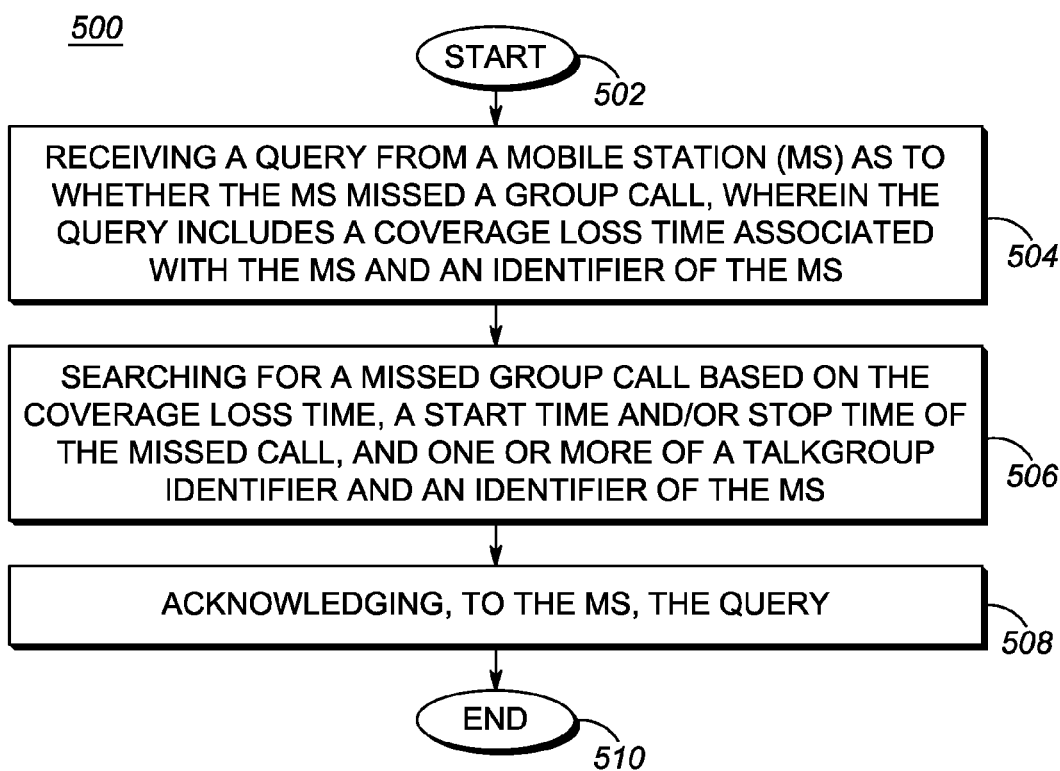
FIG. 5 is a logic flow diagram illustrating a handling, by the Group Call Server of FIG. 1, of a missed group call query in accordance with an embodiment of the present invention.

Referring now to FIGS. 4A and 4B, a logic flow diagram 400 is provided that illustrates a handling of a missed group call by an MS in accordance with an embodiment of the present invention. Logic flow diagram 400 begins (402) when an MS, for example, MS 102, loses (404) RF coverage of communication system 100. For example, the MS, that is, MS 102, may power down or the MS may roam into an area that has no RF coverage, for example, inside of a building where there is no system coverage or into a geographic region that is outside of system coverage. MS 102 then determines (406) that it has lost system coverage, for example, in response to receiving an instruction from a user of the MS to power down or based on a failure to detect a system overhead message from infrastructure 130 indicating that the MS is still in system coverage. In response to determining that it has lost system coverage, MS 102, by reference to reference clock 210, determines a coverage loss time, that is, a time associated with the loss of system coverage, and stores (408) the coverage loss time in at least one memory device 210.

Subsequent to losing system coverage, MS 102 detects (410) a resumption of system RF coverage. For example, MS 102 may power back up in communication system 100 or the MS may roam back into a geographic area that has system coverage (for example, once again detect a system overhead message from infrastructure 130). In response to resuming system coverage, MS 102 queries (412) Group Call Server 116 for missed group call information, that is, as to whether the MS missed a group call when out of system coverage and for information concerning any such missed group calls. That is, MS 102 conveys a message to the Group Call Server 116 inquiring as to whether the MS missed a group call, which message includes the identifier of the MS and the coverage loss time, and which message optionally also may include one or more talkgroup identifiers associated with talkgroups of which the MS is a member.

In response to receving the query, Group Call Server 116 informs MS 102 of any missed group calls. For example, and referring now to FIG. 5, a logic flow diagram 500 is provided that illustrates a handling, by Group Call Server 116, of the missed group call query of logic flow diagram 400 in accordance with an embodiment of the present invention. Logic flow diagram 500 begins (502) when Group Call Server 116 receives (504) the query, from MS 102, as to whether the MS missed a group call. As noted above, the query includes the identifier of the MS and the coverage loss time, and optionally also may include one or more talkgroup identifiers associated with talkgroups of which the MS is a member.

In response to receiving the query, Group Call Server 116 searches (506) Group Call Database 118 for all group calls that MS 102 may have missed. That is, Group Call Database 118 compares the coverage loss time received from MS 102 to, for group calls stored in Group Call Database 118, one or more of a start time of the group call and a stop time of the group call, and compares the MS and/or talkgroup identifiers received from MS 102 to one or more of a talkgroup identifier associated with the group call and MS identifiers associated with each MS that is a member of the talkgroup associated with the group call. Based on the comparisons, Group Call Server 116 determines one or more group calls missed by MS 102, that is, group calls that are associated with a talkgroup identifier or an MS identifier that is the same as a talkgroup identifier or an MS identifier received from MS 102 and further that have a start time, or a stop time, that is later than the coverage loss time received from the MS. In response to determining the one or more group calls missed by MS 102, Group Call Server 116 informs (508) the MS of the determined missed group calls. For example, Group Call Server 116 may convey, to MS 102, an acknowledgment of the query received from the MS, which acknowledgment includes a list of the determined missed calls. Logic flow 500 then ends (510).

Referring again to FIGS. 4A/4B, in response to conveying the query to Group Call Server 116, MS 102 receives (414) a list of missed group calls from the Group Call Server. For example, the list may be included in an acknowledgment of the query sent by the Group Call Server to the MS. In response to receiving the list of missed group calls, MS 102 displays the list of missed group calls to a user of the MS at a time that the MS is not engaged in a call. That is, in response to receiving the list of missed group calls, MS 102 determines (416) whether the MS is engaged in a call, group or otherwise. When the MS is engaged in a call, MS 102 waits (418) a period of time and then redetermines (416) whether the MS is engaged in a call, repeating these steps until the MS determines that it is not engaged in a call. At a time that the MS is not engaged in a group call, MS 102 displays (420), on display screen 208 of user interface 206, a list of missed group calls that is based on the missed group call list received from Group Call Server 116. That is, depending upon the format of the list of missed group calls received from Group Call Server 116, MS 102 may display the list of missed group calls received from Group Call Server 116 or may reformat the list for display on display screen 208. MS 102 further alerts (422) the user of the MS, for example, via an audio alert or a visual alert displayed by user interface 206, that the user has missed a group call.

In response to displaying the list of missed group calls and alerting the user of the MS 102 that the user has missed a group call, MS 102 receives (424) an instruction from the user whether to retrieve a missed group call from the displayed missed call list. When the user instructs (426) MS 102 not to retrieve a missed group call, or when no instruction is received, then the MS updates (428) the stored coverage loss time to the current time or erases the stored coverage loss time, and logic flow 400 then ends (436). When the user instructs (426) MS 102 to retrieve a missed group call, the MS requests (430), from infrastructure 130 and in particular from Group Call Server 116, a call replay record of the missed group call, which request identifies one or more missed group calls that the user instructed the MS to retrieve. For example, the request for a call replay record may identify the missed group call by including the start time and/or the stop time of the missed group call and one or more of a talkgroup identifier associated with the missed group call and MS identifiers associated with each MS that is a member of the talkgroup associated with the missed group call.

Figure 6:
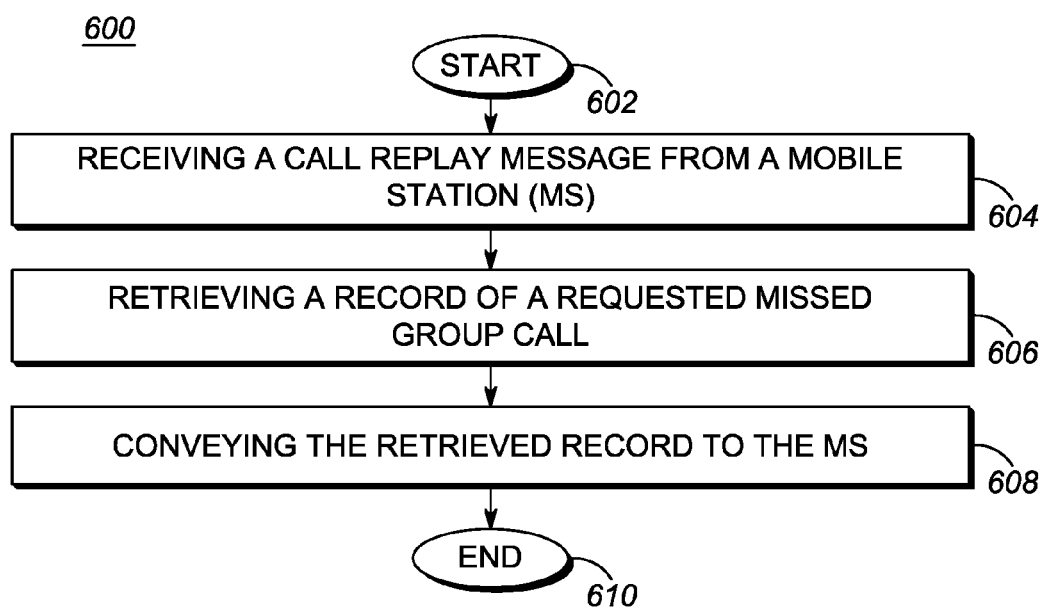
FIG. 6 is a logic flow diagram illustrating a handling, by the Group Call Server of FIG. 1, of a request for a call replay record in accordance with an embodiment of the present invention.

For example, and referring now to FIG. 6, a logic flow diagram 600 is provided that illustrates a handling, by Group Call Server 116, of a request for a call replay record in accordance with an embodiment of the present invention. Logic flow diagram 600 begins (602) when Group Call Server 116 receives (604) the request, from MS 102, for a call replay record. As noted above, the request identifies the missed group call for which the call replay record is being requested by including, in the request the start time and/or the stop time of the missed group call and one or more of a talkgroup identifier associated with the missed group call and MS identifiers associated with each MS that is a member of the talkgroup associated with the missed group call. Based on the start time and/or stop time and the one or more of a talkgroup identifier and MS identifiers associated with each MS that is a member of the talkgroup included in the request, Group Call Server 116 retrieves (606), from Media Storage 120, the stored media that was exchanged via the Group Call Server as part of the requested missed group call.

Group Call Server 116 then conveys (608) a call replay record comprising the retrieved stored media to MS 102, and logic flow diagram 600 then ends (610).

Referring again to FIGS. 4A/4B, in response to requesting the missed group call, MS 102 recieves (432) the call replay record from Group Call Server 116 and displays (434) the call replay record to the user, for example, displaying text associated with the call replay record on display screen 208 or playing out audio associated with the call replay record via a microphone (not shown) of user interface 206. Logic flow 400 then ends (436).

Figure 7:
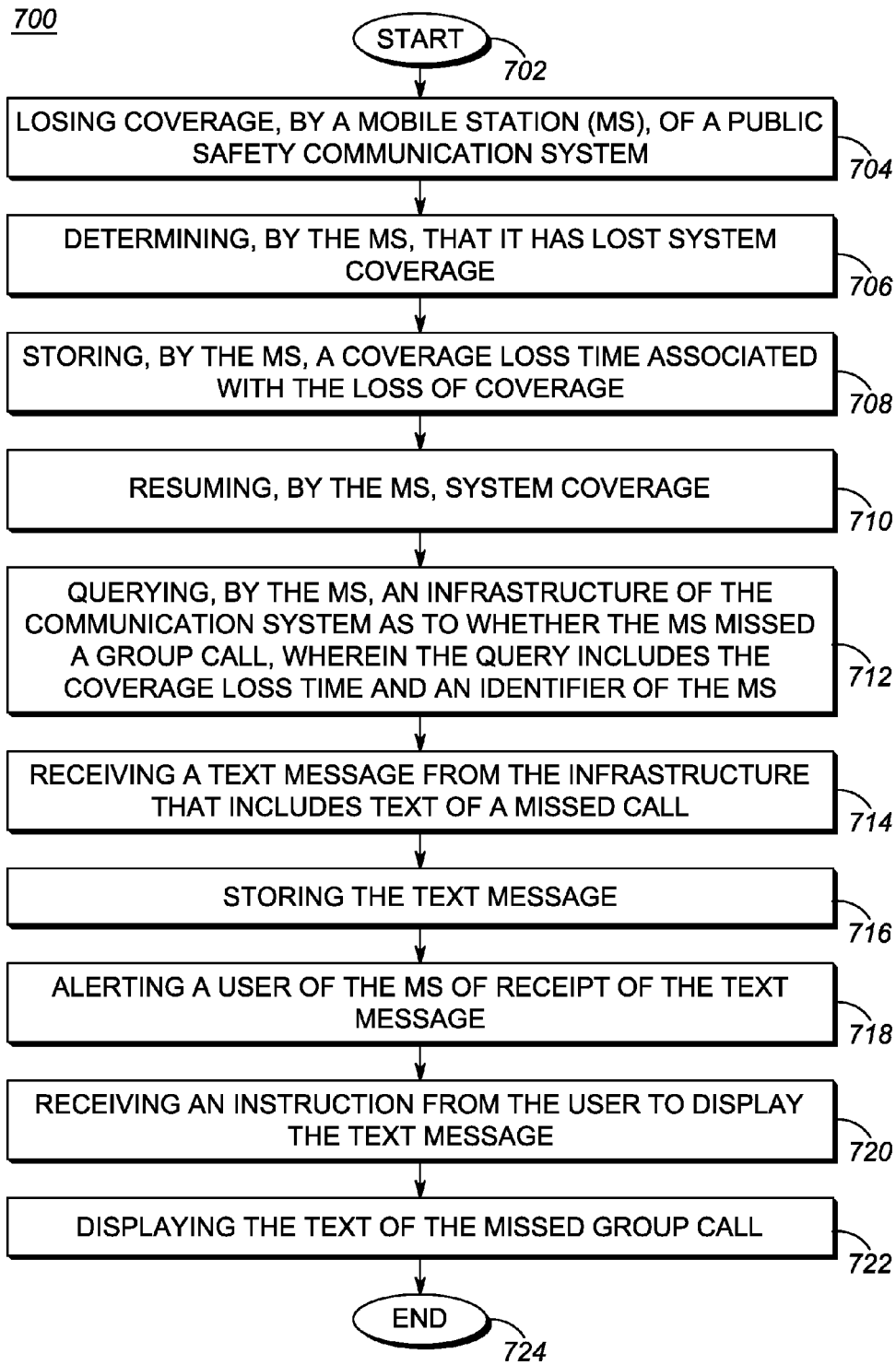
FIG. 7 is a logic flow diagram illustrating a handling of a missed group call by an an MS of FIG. 1 in accordance with another embodiment of the present invention.
Figure 8:
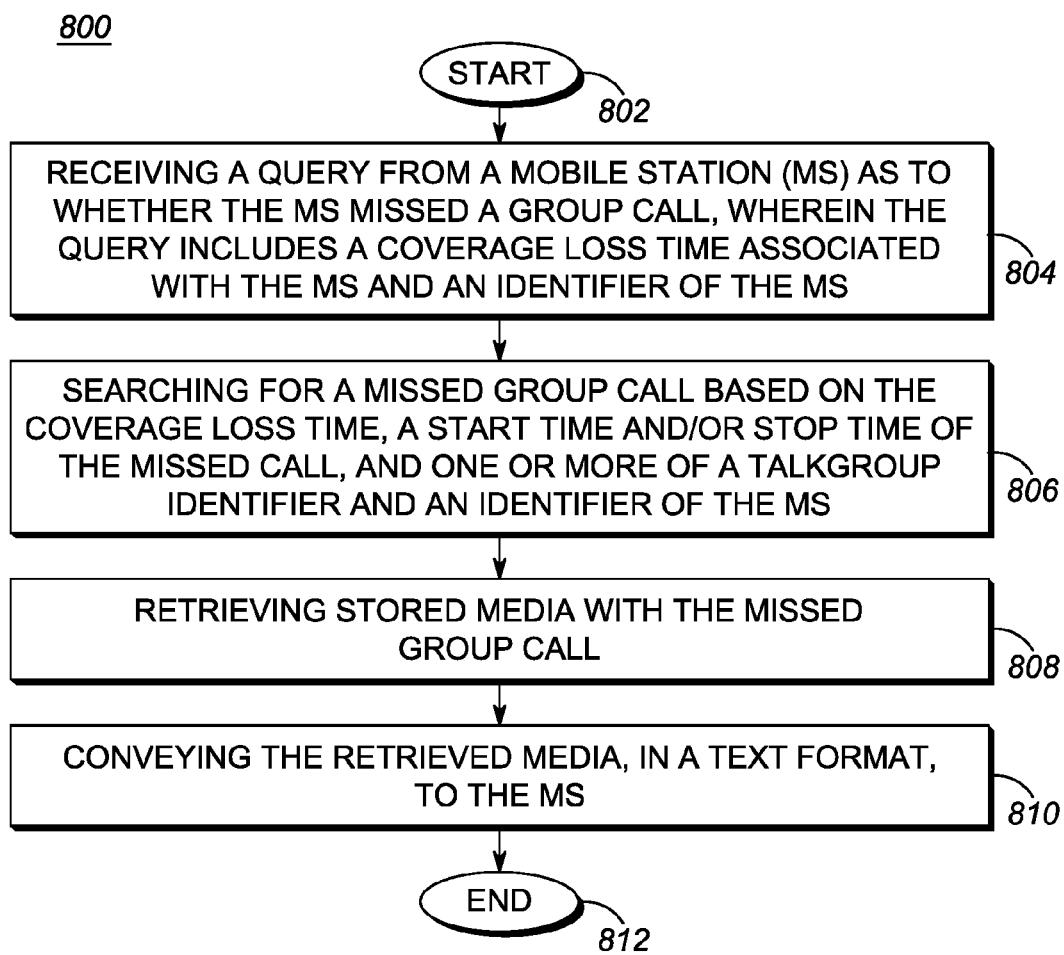
FIG. 8 is a logic flow diagram illustrating a handling, by the Group Call Server of FIG. 1, of the missed group call query in accordance with another embodiment of the present invention.

Referring now to FIG. 7, a logic flow diagram 700 is provided that illustrates a handling of a missed group call by an MS in accordance with another embodiment of the present invention. Similar to logic flow diagram 400, logic flow diagram 700 begins (702) when an MS, for example, MS 102, loses (704) RF coverage of communication system 100. MS 102 then determines (706) that it has lost system coverage, for example, in response to receiving an instruction from a user of the MS to power down or based on a failure to detect a system overhead message from infrastructure 130 indicating that the MS is still in system coverage. In response to determining that it has lost system coverage, MS 102, by reference to reference clock 210, determines a coverage loss time, that is, a time associated with the loss of system coverage, and stores (708) the coverage loss time in at least one memory device 210.

Subsequent to losing system coverage, MS 102 resumes (710) system RF coverage and queries (712) Group Call Server 116 for missed group call information, that is, as to whether the MS missed a group call when out of system coverage and for information concerning any such missed group calls. That is, MS 102 conveys a message to Group Call Server 116 inquiring as to whether the MS missed a group call, which message includes the identifier of the MS and the coverage loss time, and which message optionally also may include one or more talkgroup identifiers associated with talkgroups of which the MS is a member.

In response to receving the query, Group Call Server 116 conveys media associated with any missed group call to the MS. For example, referring now to FIG. 8, a logic flow diagram 800 is provided that illustrates a handling, by Group Call Server 116, of the missed group call query of logic flow diagram 700 in accordance with an embodiment of the present invention. Logic flow diagram 800 begins (802) when Group Call Server 116 receives (804) the query, from MS 102, as to whether the MS missed a group call. As noted above, the query includes the identifier of the MS and the coverage loss time, and optionally also may include one or more talkgroup identifiers associated with talkgroups of which the MS is a member.

In response to receiving the query, Group Call Server 116 searches (806) Group Call Database 118 for all group calls that MS 102 may have missed. That is, Group Call Database 118 compares the coverage loss time received from MS 102 to, for group calls stored in Group Call Database 118, one or more of a start time of the group call and a stop time of the group call, and compares the MS and/or talkgroup identifiers received from MS 102 to one or more of a talkgroup identifier associated with the group call and MS identifiers associated with each MS that is a member of the talkgroup associated with the group call. Based on the comparisons, Group Call Server 116 determines a group call missed by MS 102, that is, a group call that is associated with a talkgroup identifier or an MS identifier that is the same as a talkgroup identifier or an MS identifier received from MS 102 and further that has a start time and/or stop time that is later than the coverage loss time received from the MS. In response to determining the group call missed by MS 102, Group Call Server 116 retrieves (808), from Media Storage 120, the stored media that was exchanged via the Group Call Server as part of the requested missed group call and, in the case of non-text media, such as audio media, converts the non-textual media to a text format. Group Call Server 116 then assembles and conveys (810), to MS 102, a message that includes the text of the missed group call and logic flow diagram 800 then ends (812).

Referring again to FIG. 7, in response to MS 102 conveying the query to Group Call Server 116, MS 102 receives (714), from Group Call Server 116, the message that includes the text of the missed group call. MS 102 stores (716) the received message in at least one memory 204 and alerts (718) a user of the MS, for example, via an audio alert or a visual alert, that the MS has received the text of the missed group call. In response to receiving (720) an instruction from the user to display the text message, MS 102 displays (722) the text message to the user via display screen 208 and logic flow 700 then ends (724).

Figure 9A:
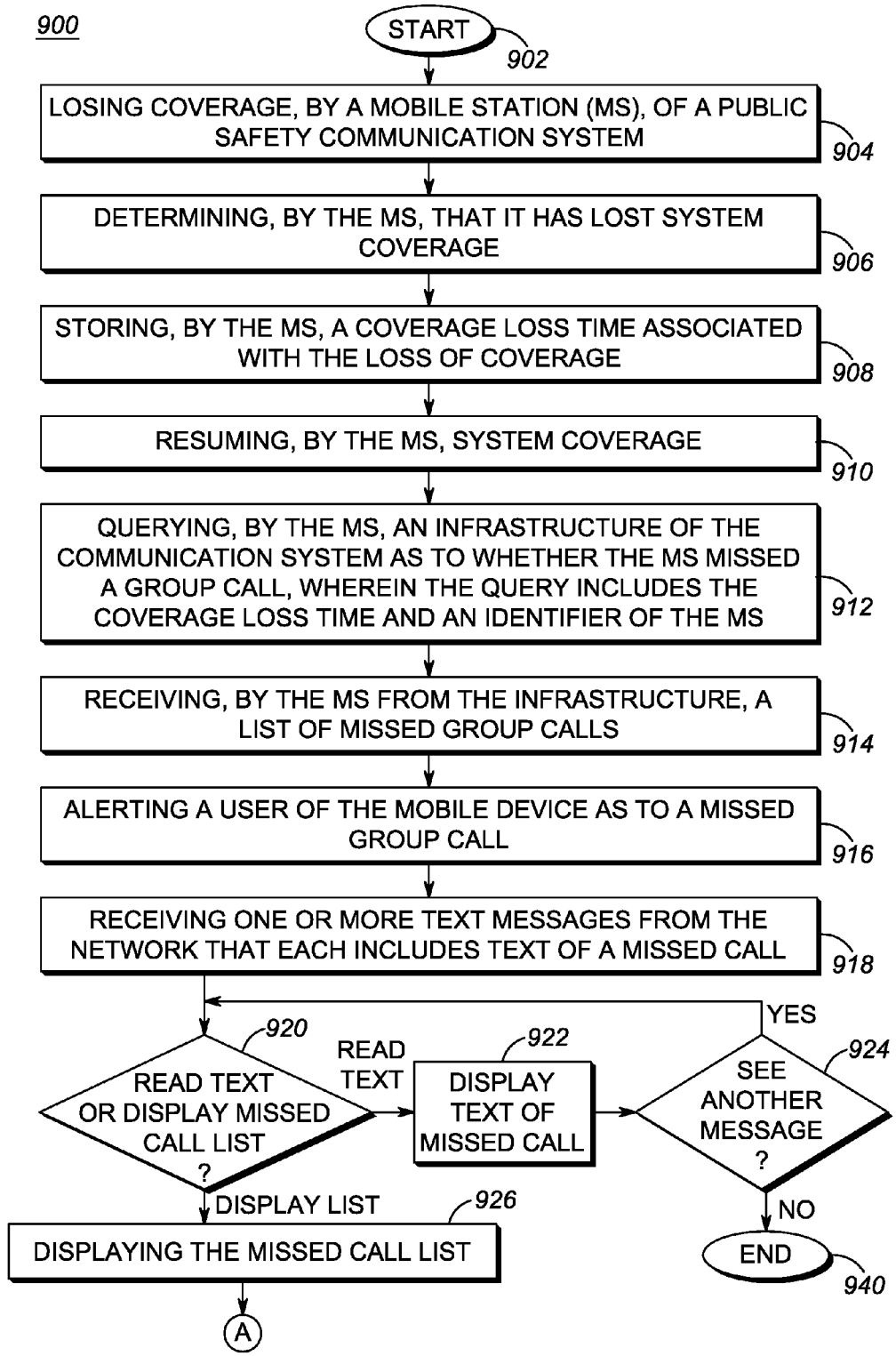
FIG. 9A is a logic flow diagram illustrating a handling of a missed group call by an MS of FIG. 1 in accordance with another embodiment of the present invention.
Figure 9B:
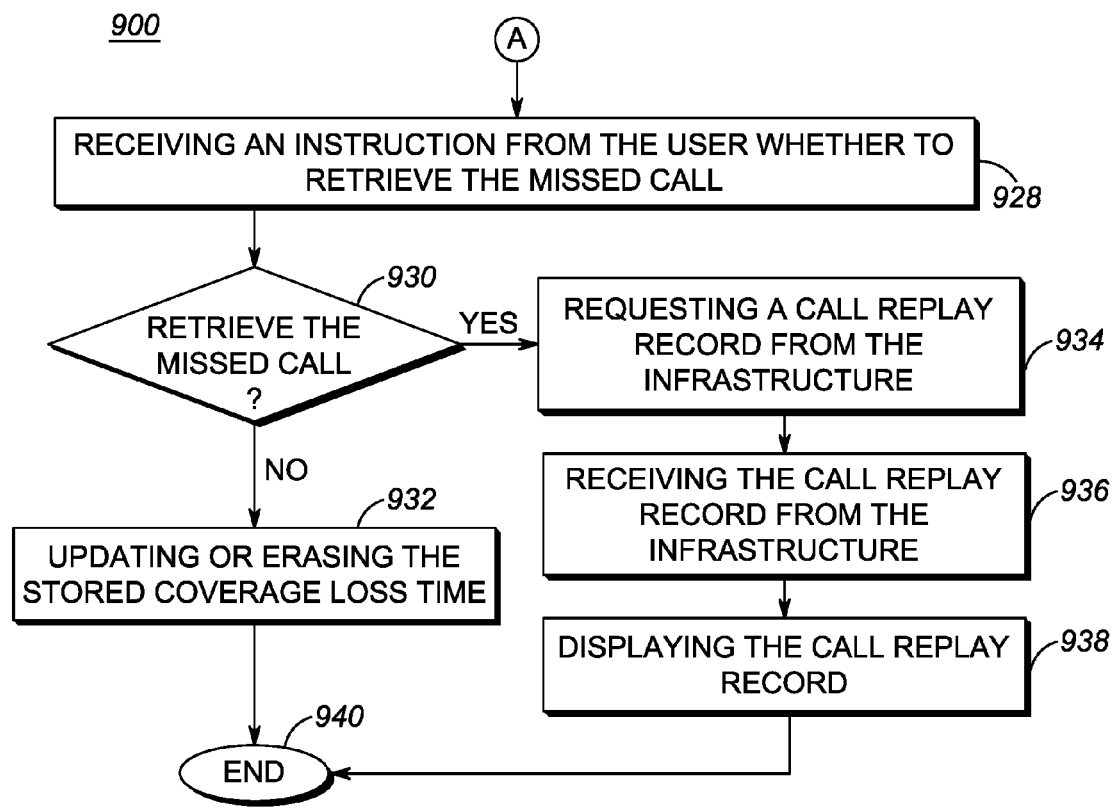
FIG. 9B is a continuation of the logic flow diagram of FIG. 4A illustrating illustrating a handling of a missed group call by an MS in accordance with another embodiment of the present invention.
Figure 10:
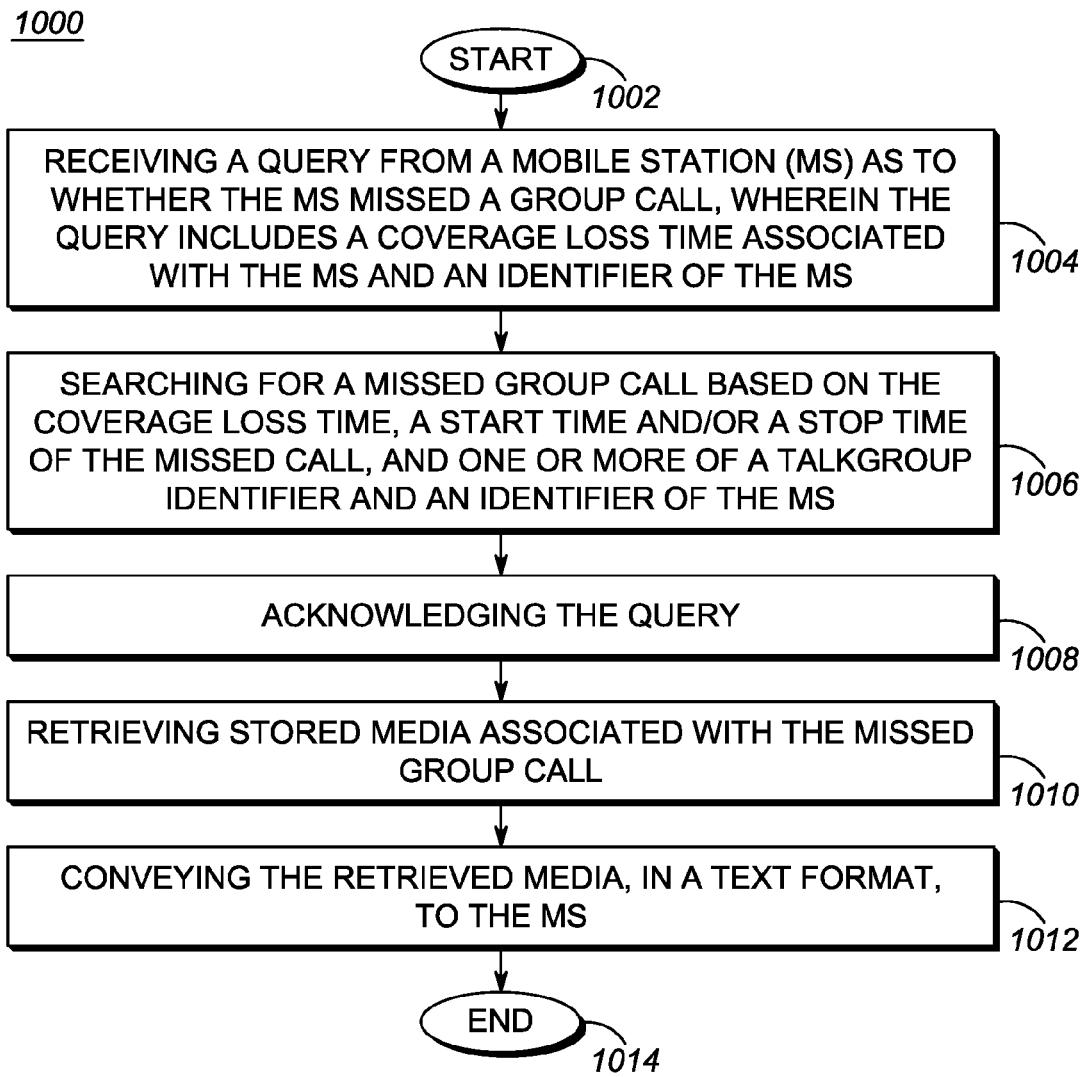
FIG. 10 is a logic flow diagram illustrating a handling, by the Group Call Server of FIG. 1, of a missed group call query in accordance with another embodiment of the present invention.

Referring now to FIGS. 9A and 9B, a logic flow diagram 900 is provided that illustrates a handling of a missed group call by an MS in accordance with yet another embodiment of the present invention. Similar to logic flow diagrams 400 and 700, logic flow diagram 900 begins (902) when an MS, for example, MS 102, loses (904) RF coverage of communication system 100. MS 102 then determines (906) that it has lost system coverage, for example, in response to receiving an instruction from a user of the MS to power down or based on a failure to detect a system overhead message from infrastructure 130 indicating that the MS is still in system coverage. In response to determining that it has lost system coverage, MS 102, by reference to reference clock 210, determines a coverage loss time, that is, a time associated with the loss of system coverage, and stores (908) the coverage loss time in at least one memory device 210.

Subsequent to losing system coverage, MS 102 resumes (910) system RF coverage and queries (912) Group Call Server 116 for missed group call information, that is, as to whether the MS missed a group call when out of system coverage and for information concerning any such missed group calls. That is, MS 102 conveys a message to Group Call Server 116 inquiring as to whether the MS missed a group call, which message includes the identifier of the MS and the coverage loss time, and which message optionally also may include one or more talkgroup identifiers associated with talkgroups of which the MS is a member.

In response to receving the query, Group Call Server 116 informs MS 102 of any missed group calls. For example, and referring now to FIG. 10, a logic flow diagram 1000 is provided that illustrates a handling, by Group Call Server 116, of the missed group call query of logic flow diagram 900 in accordance with an embodiment of the present invention. Logic flow diagram 1000 begins (1002) when Group Call Server 116 receives (1004) the query, from MS 102, as to whether the MS missed a group call. As noted above, the query includes the identifier of the MS and the coverage loss time, and optionally also may include one or more talkgroup identifiers associated with talkgroups of which the MS is a member.

In response to receiving the query, Group Call Server 116 searches (1006) Group Call Database 118 for all group calls that MS 102 may have missed. That is, Group Call Database 118 compares the coverage loss time received from MS 102 to, for group calls stored in Group Call Database 118, one or more of a start time of the group call and a stop time of the group call, and compares the MS and/or talkgroup identifiers received from MS 102 to one or more of a talkgroup identifier associated with the group call and MS identifiers associated with each MS that is a member of the talkgroup associated with the group call. Based on the comparisons, Group Call Server 116 determines one or more group calls missed by MS 102, that is, group calls that are associated with a talkgroup identifier or an MS identifier that is the same as a talkgroup identifier or an MS identifier received from MS 102 and further that have a start time and/or stop time that is later than the coverage loss time received from the MS. In response to determining the one or more group calls missed by MS 102, Group Call Server 116 informs (1008) the MS of the determined missed group calls. For example, Group Call Server 116 may convey, to MS 102, an acknowledgment of the query received from the MS, which acknowledgment includes a list of the determined missed calls.

In addition, in response to determining one or more group calls missed by MS 102, Group Call Server 116 retrieves (1010), from Media Storage 120, the stored media that was exchanged via the Group Call Server as part of the one or more requested missed group calls and, in the case of non-text media, such as audio media, converts the non-textual media to a text format. Group Call Server 116 then assembles and conveys (1012), to MS 102, a message that includes the text of one or more missed group call and logic flow diagram 1000 then ends (1014).

Referring again to FIGS. 9A/9B, in response to conveying the query to Group Call Server 116, MS 102 receives (914) a list of missed group calls from the Group Call Server and further receives (918) one or more text messages, wherein each text message includes the text of a missed group call. MS 102 the displays indications of the receipt of the list and receipt of the one or more text messages on display screen 208. The list may be conveyed, for example, in an acknowledgment of the query, sent by the Group Call Server to the MS. MS 102 then displays indications, for example, icons or text, of the receipt of the list and the receipt of the text on display screen 208 and alerts (916) a user of the MS, for example, via an audio alert or a visual alert displayed by user interface 206, that the user has missed a group call.

In response to the alert, the user then indicates to MS 102, for example, by selecting an appropriate icon or text on display screen 208, and the MS receives (920) an instruction from the user, as to whether the user wishes to read a received text message or to review the list of missed group calls. When the user indicates, at step 920, that the user wishes to read a received text message, then MS 102 displays (922), on display screen 208, a text message associated with a missed group call. The user then may further indicate (924, 920) to the MS, again by selecting an appropriate icon or text, a wish to read a next received text message, in response to which the then MS 102 displays (922), on display screen 208, a text message associated with a next missed group call. This continues until the user has reviewed all of the received text messages or is done reviewing received text messages, at which point logic flow 900 then ends (940).

When the user indicates, at step 920, that the user wishes to review the list of missed group calls or, at any time after reviewing one of the one or more received text messages, that the user wishes to review the list of missed group calls, MS 102 displays (926), on display screen 208 of user interface 206, a list of missed group calls that is based on the missed group call list received from Group Call Server 116. In response to displaying the list, the user may input to MS 102, and the MS receives (928) from the user, an instruction as to whether to retrieve a missed group call from the displayed missed call list. When the user instructs (930) MS 102 not to retrieve a missed group call, or when no instruction is received, then the MS updates (932) the stored coverage loss time to the current time or erases the stored coverage loss time, and logic flow 400 then ends (940). When the user instructs (930) MS 102 to retrieve a missed group call, the MS requests (934), from infrastructure 130 and in particular from Group Call Server 116, a call replay record of the missed group call, which request identifies one or more missed group calls that the user instructed the MS to retrieve. For example, the request for a call replay record may identify the missed group call by including the start time and/or stop time of the missed group call and one or more of a talkgroup identifier associated with the missed group call and MS identifiers associated with each MS that is a member of the talkgroup associated with the missed group call.

In response to requesting the missed group call, MS 102 recieves (936) a call replay record from Group Call Server 116 and displays (938) the call replay record to the user, for example, displaying text associated with the call replay record on display screen 208 or playing out audio associated with the call replay record via a microphone (not shown) of user interface 206, and logic flow 900 then ends (940).

If, at step 934, MS 102 requests, from infrastructure 130 and in particular from Group Call Server 116, a call replay record of the missed group call, then Group Call Server 116 retrieves and conveys a call replay record to MS 102 as described in detail with respect to logic flow diagram 600. That is, Group Call Server 116 receives (604) the request, from MS 102, for a call replay record, which request identifies the missed group call for which the call replay record is being requested by including, in the request the start time and/or stop time of the missed group call and one or more of a talkgroup identifier associated with the missed group call and MS identifiers associated with each MS that is a member of the talkgroup associated with the missed group call. Based on the start time and/or stop time and the one or more of a talkgroup identifier and MS identifiers associated with each MS that is a member of the talkgroup included in the request, Group Call Server 116 retrieves (606), from Media Storage 120, the stored media that was exchanged via the Group Call Server as part of the requested missed group call. Group Call Server 116 then conveys (608) call replay record comprising the retrieved stored media to MS 102, which is received by the MS at step 936 and displayed by the MS at step 938. Logic flow diagram 900 then ends (940).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for retrieving missed group call information in a public safety communication system, the method comprising:
   determining, by a mobile station, that the mobile station has lost system coverage;
   storing, by the mobile station, a coverage loss time, wherein the coverage loss time is a time associated with the loss of system coverage;
   detecting, by the mobile station, a resumption of system coverage;
   querying, by the mobile station, an infrastructure for missed group calls, wherein the query comprises the coverage loss time; and
   in response to the query, receiving, by the mobile station, missed group call information, wherein the missed group call information is information associated with group calls initiated subsequent to the coverage loss time;
   wherein the missed group call information includes a text of a missed group call and wherein the method further comprises;
   storing the missed group call information;
   alerting a user of the mobile station that the missed group call information is received;
   in response to alerting the user, receiving an instruction from the user to display the text of the missed group call; and
   in response to receiving the instruction displaying the text of the missed group call.

2. The method of claim 1, wherein the missed group call information comprises a list of one or more missed group calls and wherein the method further comprises:
   determining whether the mobile station is engaged in a call;
   when the mobile station is engaged in a call, waiting a period of time; and
   subsequent to waiting the time period, displaying the list of one or more missed group calls to a user of the mobile station.

3. The method of claim 1, wherein the missed group call information comprises a list of one or more missed group calls and wherein the method further comprises:
   displaying the list of one or more missed group calls; and
   in response to displaying the list, receiving an instruction from the user whether to retrieve group call information associated with the one or more missed group calls in the list of one or more missed group calls.

4. The method of claim 3, wherein receiving an instruction comprises receiving an instruction from the user to retrieve group call information associated with the one or more missed group calls and wherein the method further comprises:
   conveying, by the mobile station to the infrastructure, a request for a call replay record associated with the one or more missed group calls;
   in response to conveying the request, receiving, from the infrastructure, the call replay record associated with the one or more missed group calls; and
   displaying the received call replay record associated with the one or more missed group calls to the user of the mobile station.

5. The method of claim 3, wherein receiving an instruction comprises receiving an instruction from the user to not retrieve group call information associated with the one or more missed group calls and wherein the method further comprises:
   performing one of updating the stored coverage loss time or erasing the stored coverage loss time.

6. The method of claim 1, wherein the missed group call information includes a list of one or more missed group calls and a text of a missed group call in the list of one or more missed group calls, and wherein the method further comprises:
   receiving an instruction from a user of the mobile station to one or more of display the list of one or more missed group calls and display the text of the missed group call;
   in response to receiving an instruction to display the text of the missed group call, displaying the text of the missed group call;
   in response to receiving an instruction to display the list of one or more missed group calls:
   displaying the list; and
   in response to displaying the list, receiving an instruction from the user whether to retrieve group call information associated with the one or more missed group calls in the list of one or more missed group calls;

in response to receiving an instruction from the user to retrieve group call information associated with the one or more missed group calls, conveying, by the mobile station to the infrastructure, a request for a call replay record associated with the one or more missed group calls;

receiving, from the infrastructure, the call replay record associated with the one or more missed group calls; and displaying the received call replay record associated with the one or more missed group calls to the user of the mobile station.

7. The method of claim 6, wherein receiving an instruction comprises receiving an instruction from the user not to retrieve group call information associated with the one or more missed group calls in the list of one or more missed group calls and wherein the method further comprises:

performing one of updating the stored coverage loss time or erasing the stored coverage loss time.

8. A mobile station capable of engaging in a Push-to-Talk communication session, the mobile station comprising:

a transceiver;
an at least one memory device; and
a processor configured to:
determine a loss of system coverage;
store, in the at least one memory device, a time associated with the loss of system coverage;
detect a resumption of system coverage;
query, via the transceiver, an infrastructure for missed group calls, wherein the query comprises the time associated with the loss of coverage; and
in response to the query, receive, via the transceiver, a list of one or more missed group calls, wherein the missed group calls were calls initiated subsequent to the time associated with the loss of coverage,
wherein the missed group call information includes a text of a missed group call and wherein the processor is configured to;
store the missed group call information;
alert a user of the mobile station that the missed group call information is received;
in response to alerting the user, receive an instruction from the user to display the text of the missed group call; and
in response to receiving the instruction, display the text of the missed group call.

9. The mobile station of claim 8, wherein the missed group call information comprises a list of one or more missed group calls and wherein the processor is configured to:

determine whether the mobile station is engaged in a call;
when the mobile station is engaged in a call, wait a period of time; and
subsequent to waiting the time period, display the list of one or more missed group calls to a user of the mobile station.

10. The mobile station of claim 8, wherein the missed group call information comprises a list of one or more missed group calls and wherein the processor is configured to:

display the list of one or more missed group calls; and
in response to displaying the list, receive an instruction from the user whether to retrieve group call information associated with the one or more missed group calls in the list of one or more missed group calls.

11. The mobile station of claim 10, wherein the processor is configured to receive an instruction by receiving an instruction from the user to retrieve group call information associated with the one or more missed group calls and wherein the processor further is configured to:

convey, to the infrastructure, a request for a call replay record associated with the one or more missed group calls;

in response to conveying the request, receive, via the transceiver, the call replay record associated with the one or more missed group calls; and display the received call replay record associated with the one or more missed group calls to the user of the mobile station.

12. The mobile station of claim 10, wherein the processor is configured to receive an instruction by receiving an instruction from the user to not retrieve group call information associated with the one or more missed group calls and wherein the processor further is configured to:

perform one of updating the stored coverage loss time or erasing the stored coverage loss time.

13. The mobile station of claim 11, wherein the missed group call information includes a list of one or more missed group calls and a text of a missed group call in the list of one or more missed group calls, and wherein the processor is configured to:

receive an instruction from a user of the mobile station to one or more of display the list of one or more missed group calls and display the text of the missed group call;

in response to receiving an instruction to display the text of the missed group call, display the text of the missed group call;

in response to receiving an instruction to display the list of one or more missed group calls:
display the list; and
in response to displaying the list, receive an instruction from the user whether to retrieve group call information associated with the one or more missed group calls in the list of one or more missed group calls;

in response to receiving an instruction from the user to retrieve group call information associated with the one or more missed group calls, convey, to the infrastructure via the transceiver, a request for a call replay record associated with the one or more missed group calls;

receive, via the transceiver, the call replay record associated with the one or more missed group calls; and display the received call replay record associated with the one or more missed group calls to the user of the mobile station.

14. The mobile station of claim 13, wherein receiving an instruction comprises receiving an instruction from the user not to retrieve group call information associated with the one or more missed group calls in the list of one or more missed group calls and wherein the method further comprises:

performing one of updating the stored coverage loss time or erasing the stored coverage loss time.

* * * * *